(12) United States Patent
Lataretu

(10) Patent No.: US 7,525,903 B2
(45) Date of Patent: Apr. 28, 2009

(54) METHOD FOR IMPROVED PACKET 1+1 PROTECTION

(75) Inventor: Florin-Josef Lataretu, Franken (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 719 days.

(21) Appl. No.: 11/133,016

(22) Filed: May 19, 2005

(65) Prior Publication Data

US 2006/0268893 A1    Nov. 30, 2006

(51) Int. Cl.
*G01R 31/08* (2006.01)
(52) U.S. Cl. ..................................... 370/216
(58) Field of Classification Search ................ 370/227, 370/228

See application file for complete search history.

(56) References Cited

U.S. PATENT DOCUMENTS 6,359,858 B1 *   3/2002   Smith et al. ................. 370/217

OTHER PUBLICATIONS

"Architecture and Specification of Data Communication Network," ITU-T Rec. G. 7712/Y.1703 (Mar. 2003).

* cited by examiner

*Primary Examiner*—Daniel J Ryman
*Assistant Examiner*—John Blanton

(57) ABSTRACT

The invention includes a method for monitoring packet protection quality. A first method according to the present invention includes initializing a current sliding window having a current sliding window length, measuring a current delay window length of a current delay window by monitoring a difference between a leading path counter and a trailing path counter, and identifying a quality degradation condition in response to a determination that the current delay window length exceeds the current sliding window length. A second method according to the present invention includes measuring a leading path quality associated with a leading path, measuring a trailing path quality associated with a trailing path, and identifying a path quality degradation condition in response to at least one of determining that the leading path quality measure crosses a leading path quality threshold and determining that the trailing path quality measure crosses a trailing path quality threshold.

19 Claims, 5 Drawing Sheets

100

300

FIG. 4
400
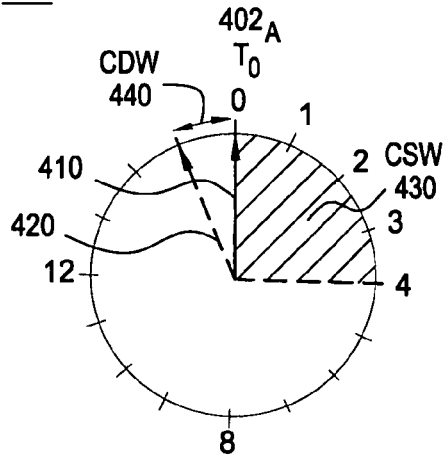
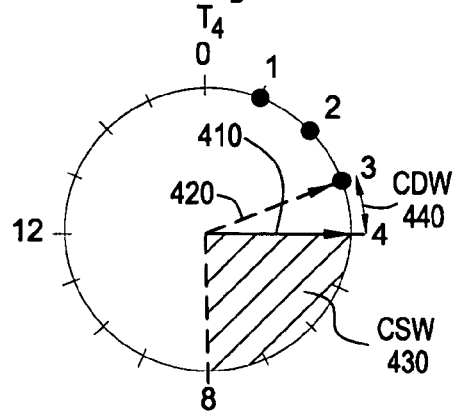
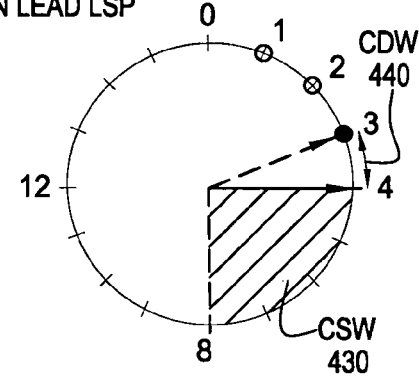
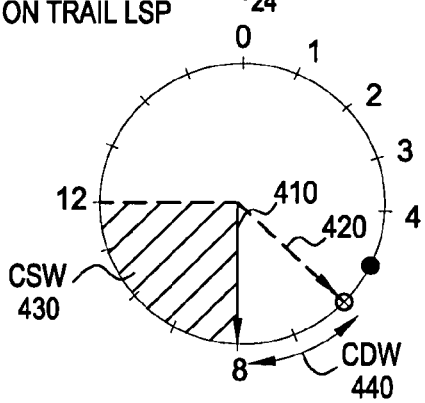
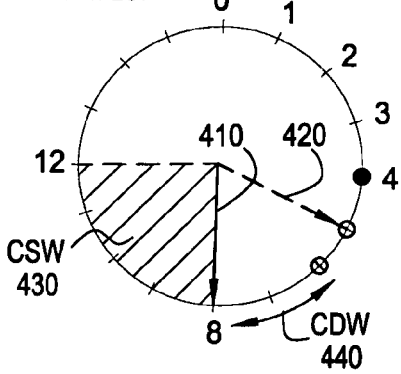
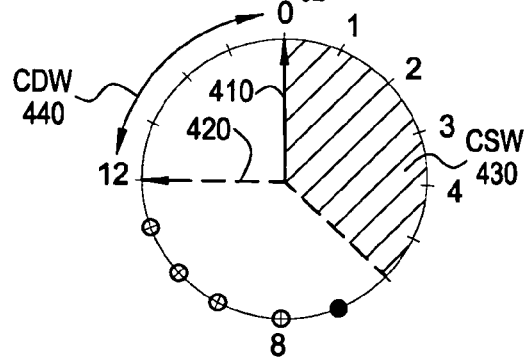

METHOD FOR IMPROVED PACKET 1+1 PROTECTION

FIELD OF THE INVENTION

The invention relates to the field of communication networks and, more specifically, to packet 1+1 protection.

BACKGROUND OF THE INVENTION

The International Telecommunications Union—Telecommunication (ITU-T) G.7712 standard mandates packet 1+1 protection using a pair of associated label-switched paths (LSPs). According to the G.7712 standard, identification of duplicate packets is performed using a sequence number N. The sequence number N is carried in every packet as the first four bytes in the SHIM header for each LSP providing packet 1+1 protection. In order to solve the wrap-around problem encountered upon reaching the $2^N$ upper limit of the sequence number, the ITU-T G.7712 standard specifies use of a sliding window (SW) configured to half of the $2^N$ upper limit of the sequence number (i.e., $SW=2^{N-1}$).

In other words, the ITU-T G.7712 standard recommends use of a sliding window to solve the problem of losing packets on a leading LSP as the leading LSP sequence number approaches the wrap-around point. The ITU-T G.7712 standard additionally recommends the use of a delay window (DW). As such, the ITU-T G.7712 standard specifies that the number of bits used for sequence number N must conform to a particular set of rules. Furthermore, the ITU-T G.7712 standard recommends that SW size and DW size be configured such that the SW size is equal to the DW size. Unfortunately, the ITU-T G.7712 standard is unclear as to whether the recommendations for SW size and DW size, define (1) in practice experienced (C1) conditions, or (2) a priory required (C2) conditions.

The illustrating examples of the ITU-T G.7712 standard suggest values of $SW\sim 2^{N-1}$ and $DW=SW-1$, such that $SW+DW<2^N$. In general, the suggested values are sufficiently large to allow the C1 interpretation of the ITU-T G.7712 standard (i.e., in practice experienced values) such that, in practice, the maximum number of consecutive packets that can be lost on an LSP and the maximum number of packets the trailing LSP can fall behind the leading LSP never exceed $2^{N-1}$. Unfortunately, however, a large sliding window may have a negative impact on the buffer resources, as well as the behavior, of the transport layer (e.g., TCP).

In general, applications requiring high reliability cannot tolerate losses of large numbers of packets. Furthermore, the C2 interpretation of the ITU-T G.7712 standard (i.e., a priory required values) results in numerous problems. Since the DW is generally dependent on the LSP pair (i.e., it may vary over time for a given LSP pair), there is an issue as to handling of a situation in which the required value is exceeded. A related problem is that the SW must be both large enough to cover all variations of the DW, and larger than the maximum number of consecutive packets a working LSP can lose.

In each case, there is an issue as to handling of the various situations in which a required value is exceeded. As such, since a portion of rules of the ITU-T G.7712 standard are violated, packets begin to be irreversibly lost, the associated LSP pair is dropped, and the transport layer (and possibly the application) needs to recover. Although such recovery processing may be performed, restoration time is seriously impacted. Furthermore, both the C1 and C2 interpretations of the ITU-T G.7712 show substantial limitations of the traditional packet 1+1 protection described in accordance with the ITU-T G.7712 standard.

SUMMARY OF THE INVENTION

Various deficiencies in the prior art are addressed through the invention of a method for monitoring packet protection quality. A method according to one embodiment of the present invention includes initializing a current sliding window having a current sliding window length, measuring a current delay window length of a current delay window by monitoring a difference between a leading path counter and a trailing path counter, and identifying a quality degradation condition in response to a determination that the current delay window length exceeds the current sliding window length. A method according to one embodiment of the present invention includes measuring a leading path quality associated with a leading path, measuring a trailing path quality associated with a trailing path, and identifying a path quality degraded condition in response to at least one of determining that the leading path quality measure crosses a leading path quality threshold and determining that the trailing path quality measure crosses a trailing path quality threshold.

BRIEF DESCRIPTION OF THE DRAWINGS

The teachings of the present invention can be readily understood by considering the following detailed description in conjunction with the accompanying drawings, in which:

FIG. 4 depicts a graphical representation of an example of improved packet 1+1 protection according to one embodiment of the invention.

To facilitate understanding, identical reference numerals have been used, where possible, to designate identical elements that are common to the figures.

DETAILED DESCRIPTION OF THE INVENTION

The invention is discussed in the context of a communications network architecture utilizing multi-protocol label switching (MPLS); however, the methodologies of the present invention can readily be applied to other networks. In general, the present invention improves the behavior of packet 1+1 protection with respect to performance, reliability, and the like by providing early error detection and avoidance. The present invention improves traditional packet 1+1 protection (e.g., ITU-T G.7712 packet 1+1 protection) by integrating application requirements while accounting for dynamics introduced by use of supporting paths (e.g., trailing label switched paths (LSPs)) for providing packet 1+1 protection. As such, the present invention enables substantially immediate reaction to protection quality degradations in order to prevent large application packet losses. Therefore, the present invention enables improved performance, improved reliability, and like improvements for time-critical applications.

In one embodiment, the present invention monitors degradation of packet protection below a protection quality measure. In one embodiment, the present invention monitors a leading path quality measure associated with a leading path (e.g., a leading LSP in a MPLS network) and a trailing path quality measure associated with a trailing path (e.g., a trailing LSP in a MPLS network). In one embodiment, the present invention utilizes an adaptive sliding window to ensure that at least one condition (e.g., a quality measure condition) is fulfilled. In one further embodiment, at least a portion of the monitored quality measure information is used for initiating at least one preventive countermeasure operable for at least preventing further packet protection quality degradation and, optionally, for improving packet protection quality.

Figure 1:
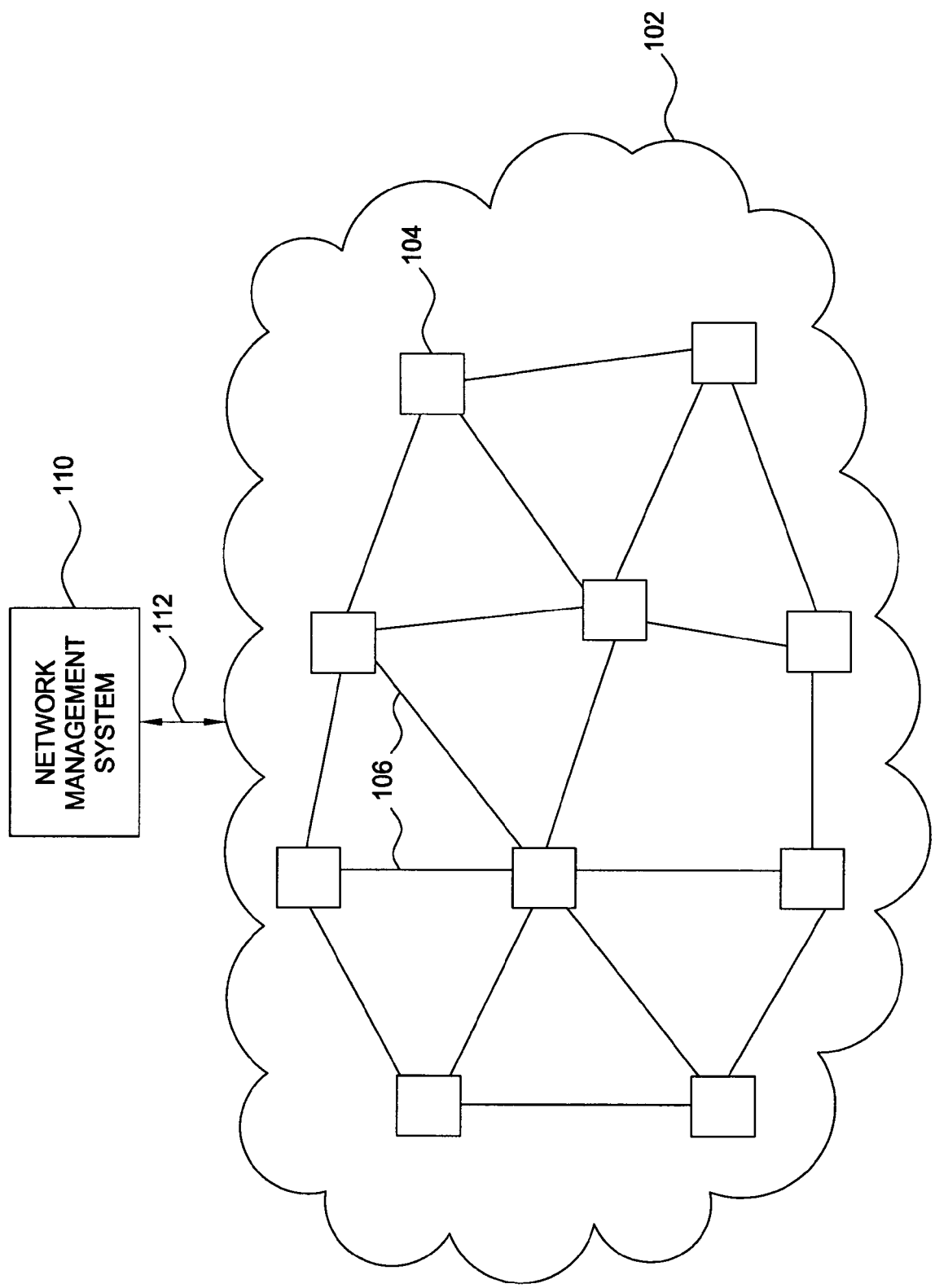
FIG. 1 depicts a high-level block diagram of a communications network architecture.

FIG. 1 depicts a high-level block diagram of a communications network architecture. Specifically, communications network architecture 100 of FIG. 1 comprises a network 102 and a network management system (NMS) 110 in communication using a communication link (CL) 112. As depicted in FIG. 1, network 102 comprises a plurality of network elements (NEs) 104 (collectively, NEs 104) in communication using a plurality of communication links (CLs) 106 (collectively, CLs 106). In general, network 102 comprises a network operable for transporting traffic according to packet 1+1 protection capabilities. Thus, in one embodiment, associated NEs 104 comprise devices operable for performing packet 1+1 protection. For example, in one embodiment, network 102 comprises an Internet Protocol (IP) network utilizing MPLS, including MPLS packet 1+1 protection.

In general, MPLS, which remains independent of layer-two and layer-three protocols, comprises mechanisms for managing traffic flows of various granularities (e.g., flows between network elements, flows between applications, and the like). In MPLS, data transmission occurs on label switched paths (LSPs), where LSPs comprise respective sequences of labels at each node (illustratively, NEs 104) along a path from a source to a destination. In one embodiment, LSPs are established prior to data transmission. In another embodiment, LSPs are established upon detection of a certain flow of data. The labels, which comprise identifiers specific to an underlying protocol, are distributed using Label Distribution Protocol (LDP), Reservation Protocol (RSVP), routing protocols (e.g., border gateway protocol (BGP)), and like protocols.

The devices that participate in MPLS mechanisms may be classified as label edge routers (LERs) and label switching routers (LSRs). An LER, which operates at the edge of the MPLS network, comprises multiple ports connected to potentially dissimilar networks (e.g., frame relay (FR) networks, asynchronous transfer mode (ATM) networks, Ethernet networks, and the like) and forwards the traffic associated with the access networks to the MPLS network after establishing associated LSPs. An LSR comprises a high-speed router device operating in the core of an MPLS network. An LSR is operable for establishing LSPs using an appropriate label switching protocol and performs high-speed switching of data traffic using the established LSPs. As such, in one embodiment, NEs 104 comprise at least one of an LER and an LSR.

In one embodiment, at least a portion of the methodologies of the present invention are performed by NEs 104. For example, in one embodiment, NEs 104 are operable for initializing a current sliding window comprising a current sliding window length, determining a current delay window length by monitoring a difference between a leading path and a trailing path, and identifying a quality degradation condition using the current sliding window and the current delay window. In one embodiment, NEs 104 are operable for identifying a path quality degradation condition using a leading path quality measure and a trailing path quality measure. In one embodiment, at least a portion of the methodologies of the present invention are performed by NMS 110. For example, in one embodiment, NMS 110 is operable for receiving and displaying at least one alert indicative of a quality degradation condition.

Although depicted as comprising specific numbers of networks 102, NEs 104, CLs 106, NMSs 110, and CLs 112, those skilled in the art will appreciate that fewer or more networks 102, NEs 104, CLs 106, NMSs 110 and CLs 112 may be used. Similarly, the networks 102, NEs 104, CLs 106, NMSs 110 and CLs 112 may be deployed in various other configurations. Similarly, various other networks, network management systems, network elements, and like devices, as well as associated communication links, may be utilized in support of the methodologies of the present invention. Furthermore, although described herein with respect to MPLS packet 1+1 protection, the methodologies of the present invention may be used in various other packet protection schemes.

In general, the present invention introduces various protection quality measures operable for detecting degradation of protection quality, as well as reacting to degradation of protection quality. In one embodiment, protection quality degradation may be identified at various different levels (e.g., overall protection quality of a path pair, path protection quality of individual paths in a path pair, and the like. In one embodiment, reaction to a protection quality degradation condition comprises at least one of adaptively relaxing protection quality requirements, initiating countermeasures operable for improving protection quality, initiating protection quality degradation notifications, and the like.

In one embodiment, the present invention introduces an overall protection quality measure (denoted as Q) and an associated protection quality tolerance measure (denoted as T). In one embodiment, in which the present invention is used for improving packet 1+1 protection implemented according to the ITU-T G.7712 standard, use of protection quality tolerance T (where $T<<2^{N-1}$) provides a more stringent requirement on acceptable packet losses than rule R1 of the ITU-T G.7712 standard. Furthermore, the fixed configuration of the sliding window as defined in the ITU-T G.7712 standard (usually half of $2^N$ in a wrap-around solution) is replaced with a current sliding window (CSW). As such, as described herein, a CSW comprises an adaptive window operable for modifying its size such that CSW>T and CSW>CDW are maintained.

Furthermore, the present invention introduces path-level protection quality measures (e.g., a leading path protection quality measure and a trailing path protection quality measure). In one embodiment, a leading path quality measure represents the quality of the leading path and a trailing path quality measure represents the quality of the trailing path. In one embodiment, the leading path quality measure and the trailing path quality measure are operable for use in initiating countermeasures operable for improving protection quality prior to overall protection degradation. In one such embodiment, in which the leading path and the trailing path comprise label switched paths, respectively, leading path quality measure $Q_{LP}$ reflects the quality of the leading LSP and trailing path quality measure $Q_{TP}$ reflects the quality of the trailing LSP.

Figure 2:
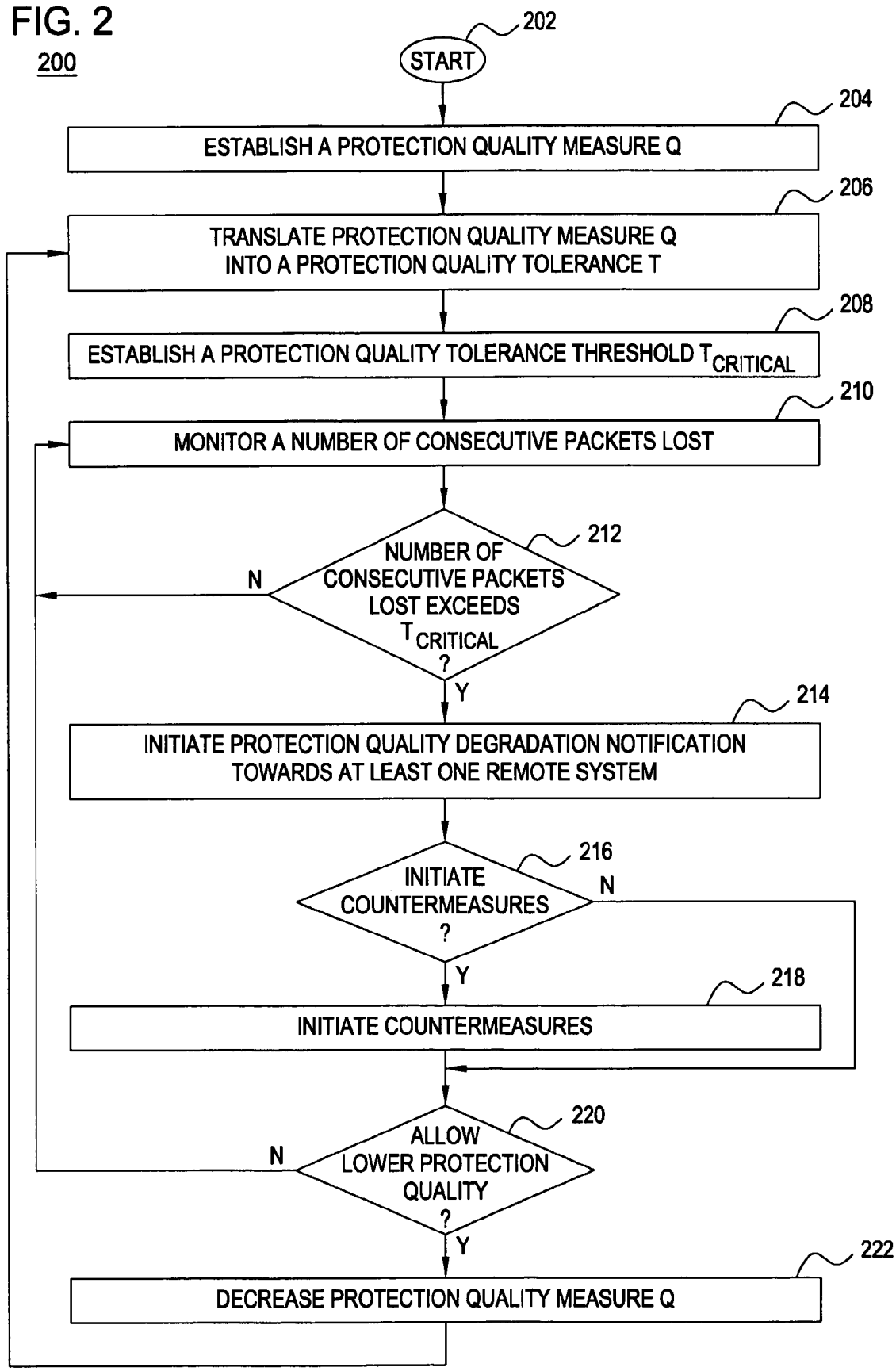
FIG. 2 depicts a flow diagram of a method according to one embodiment of the invention.

FIG. 2 depicts a flow diagram of a method according to one embodiment of the invention. In general, method 200 of FIG. 2 comprises a method for monitoring a packet protection quality. Although specifically depicted as comprising a method for monitoring a protection quality of packet 1+1 protection, method 200 of FIG. 2 may be used for monitoring packet protection quality in various other packet protection schemes. Although a portion of the steps are depicted as being performed serially, those skilled in the art will appreciate that at least a portion of the steps of method 200 may be performed contemporaneously, as well as in a different order than presented in FIG. 2. The method 200 is entered at step 202 and proceeds to step 204.

At step 204, a protection quality measure Q is established. In one embodiment, protection quality measure Q comprises a function of an operator expectation. For example, in one embodiment, protection quality measure Q is established by a service provider using at least one management system (illustratively, NMS 110). In one embodiment, protection quality measure Q represents at least one application requirement. For example, protection quality measure Q may be set in such a manner that minimal packet losses are tolerated for a time-critical application. In one embodiment, in which the present invention is implemented as an improvement of packet 1+1 protection according to the ITU-T G.7712 standard, protection quality measure Q is independent of the range of sequence numbers N.

In one embodiment, protection quality measure Q is established network-wide (i.e., applied to all leading/trailing path pairs established in a network). In another embodiment, protection quality measure Q is established per leading/trailing path pair (i.e., the value of protection quality measure Q varies across path pairs). In another embodiment, protection quality measure Q is established per application (i.e., the value of protection quality measure Q varies across applications and, optionally, across application sessions). In one embodiment, protection quality measure Q is proportional to the inverse of a protection quality tolerance T.

At step 206, protection quality measure Q is translated into a protection quality tolerance T. In one embodiment, protection quality tolerance T comprises a maximum number of consecutive packets for which loss is acceptable (i.e., T comprises a tolerance on losing packets). In one embodiment, protection quality tolerance T comprises a maximum number of consecutive packets for which loss is acceptable for an application. It should be noted that, by involving the application in accordance with the present invention, the limit on the number of lost packets is reduced from $2^{N-1}$ (i.e., as defined by the ITU-T G.7712 standard) to a number significantly below $2^{N-1}$ (i.e., $T<<2^{N-1}$). As such, the present invention enables a significantly more stringent limit on the number of lost packets.

At step 208, a protection quality tolerance threshold $T_{TH}$ is established. In one embodiment, protection quality tolerance threshold $T_{TH}$ is proportional to protection quality tolerance T. For example, in one embodiment, protection quality tolerance threshold $T_{TH}=(f_1)(T)$, where $f_1$ comprises a first configuration factor ($f_1 \leq 1$). In one embodiment, the protection quality tolerance threshold $T_{TH}$ is configurable. For example, in one embodiment, the protection quality tolerance threshold is automatically reconfigured in response to detection of protection quality degradation. Similarly, in one embodiment, protection quality tolerance threshold $T_{TH}$ is modified in response to a change to protection quality measure Q.

At step 210, a number of consecutive packets lost is monitored. In one embodiment, the number of consecutive packets lost comprises a number of consecutive packets lost on a leading LSP. In one embodiment, the number of consecutive packets lost comprises a number of consecutive packets lost on a trailing LSP. In one embodiment, the number of consecutive packets lost comprises a number of consecutive packets lost on a leading LSP and a number of consecutive packets lost on a trailing LSP. In one embodiment, monitoring of the number of consecutive packets lost is performed using at least one of leading path quality measure $Q_{LP}$ and trailing path quality measure $Q_{TP}$.

At step 212, a determination is made as to whether the number of consecutive packets lost exceeds protection quality tolerance threshold $T_{TH}$. In one embodiment, the determination as to whether the number of consecutive packets lost exceeds protection quality tolerance $T_{TH}$ is performed in response to each received packet. If the number of consecutive packets lost does not exceed $T_{TH}$, method 200 returns to step 210, where monitoring of the number of consecutive packets lost continues. If the number of consecutive packets lost exceeds $T_{TH}$, method 200 proceeds to step 214. At step 214, a protection quality degradation notification is initiated toward at least one remote system. For example, a protection quality degradation notification is initiated by one of the NEs 104 towards NMS 110. The method 200 then proceeds to step 216.

At step 216, a determination is made as to whether to initiate countermeasures in response to detection of the protection quality degradation condition. If countermeasures are not initiated, method 200 proceeds to step 220, at which point a determination is made as to whether a lower protection quality is allowed. If countermeasures are initiated, method 200 proceeds to step 218. At step 218, at least one countermeasure is initiated. In one embodiment, a countermeasure is operable for preventing further degradation of packet protection quality. In one embodiment, a countermeasure is operable for improving packet protection quality.

In one embodiment, initiation of a countermeasure comprises establishing at least one new LSP in the network and switching traffic to the at least one new LSP. In one embodiment, for example, traffic may be switched from the current leading LSP to a new leading LSP. Similarly, for example, traffic may be switched from the current trailing LSP to a new trailing LSP. In one embodiment, for example, traffic may be switched from the current leading LSP to the current trailing LSP (e.g., the current trailing LSP becomes a leading LSP), and the current trailing LSP is replaced with a new trailing LPS. Similarly, for example, traffic may be switched from the current trailing LSP to the current leading LSP (i.e., the current leading LSP becomes a trailing LSP), and the current leading LSP is replaced with a new leading LPS.

At step 220, a determination is made as to whether lower protection quality is allowed. If lower protection quality is not allowed, method 200 returns to step 210, where monitoring of the number of consecutive packets lost continues. If lower protection quality is allowed, method 200 proceeds to step 222. At step 222, protection quality measure Q is decreased. As described herein, protection quality measure Q may be decreased for a path pair, all path pairs, and the like. The method 200 then returns to step 206, at which point decreased quality protection measure Q is translated into an associated increased protection quality tolerance T. In other words, the tolerance for the number of lost packets is increased.

Figure 3:
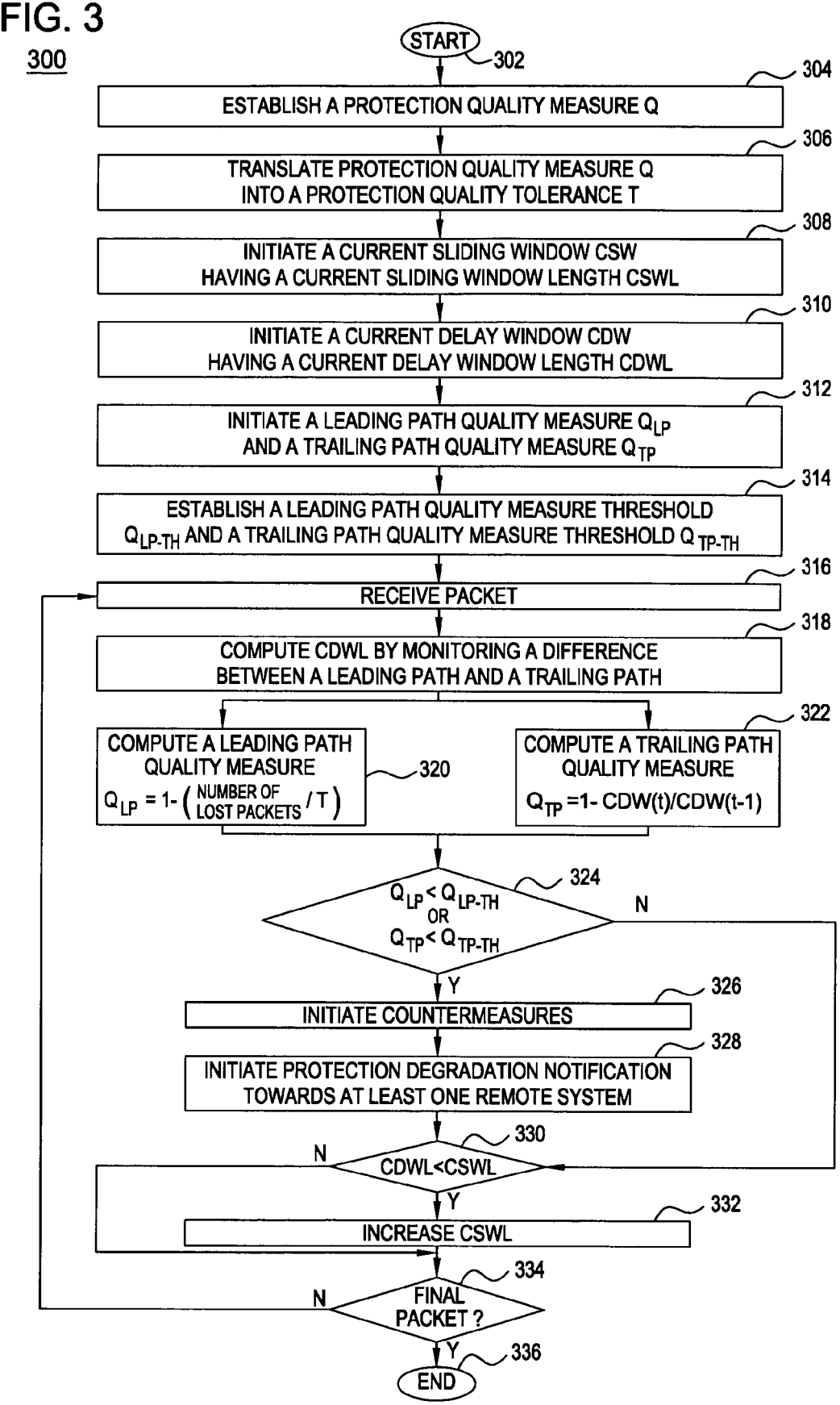
FIG. 3 depicts a flow diagram of a method according to one embodiment of the invention.

FIG. 3 depicts a flow diagram of a method according to one embodiment of the invention. In general, method 300 of FIG. 3 comprises a method for monitoring a packet protection quality. Although specifically depicted as comprising a method for monitoring a protection quality of packet 1+1 protection, method 300 of FIG. 3 may be used for monitoring packet protection quality in various other packet protection schemes. Although a portion of the steps are depicted as being performed serially, those skilled in the art will appreciate that at least a portion of the steps of method 300 may be performed contemporaneously, as well as in a different order than presented in FIG. 3. The method 300 is entered at step 302 and proceeds to step 304.

At step 304, a protection quality measure Q is established. At step 306, protection quality measure Q is translated into a protection quality tolerance T. At step 308, a current sliding window (CSW) is initiated (at an initial time (denoted as $t_0$) as which no packets have been received). In one embodiment, the CSW is initiated to a current sliding window length (CSWL) such that CSWL>T. For example, in one embodiment, $CSWL(t_0)=T+1$. At step 310, a current delay window (CDW) is initiated. In one embodiment, the CDW is initiated to a current delay window length (CDWL) such that $CDWL(t_0)<CSW(t_0)$.

At step 312, a leading path quality measure $Q_{LP}$ and a trailing path quality measure $Q_{TP}$ are initiated. In one embodiment, $Q_{LP}$ and $Q_{TP}$ are monitored for preventing a condition in which: $CSWL(t)>CDWL(t)$. At step 314, a leading path quality measure threshold $Q_{LP-TH}$ and a trailing path quality measure threshold $Q_{TP-TH}$ are initialized. In one embodiment, at least one of leading path quality measure threshold $Q_{LP-TH}$ and trailing path quality measure threshold $Q_{TP-TH}$ is determined using protection quality tolerance T. In one embodiment, at least one of leading path quality measure threshold $Q_{LP-TH}$ and trailing path quality measure threshold $Q_{TP-TH}$ comprises a dynamic value modified using at least one of CSWL, CDWL, and like values.

At step 316, a packet is received. At step 318, CDWL(t) is computed. In one embodiment, CDWL(t) is computed by monitoring a difference between a leading path counter and a trailing path counter. Following computation of CDWL(t), method 300 proceeds to steps 320 and 322 contemporaneously. At step 320, leading path quality measure $Q_{LP}(t)$ is computed. In one embodiment, leading path quality measure $Q_{LP}(t)$ is computed using a number of lost packets and protection quality tolerance T (i.e., $Q_{LP}(t)=1-((number of lost packets)/T))$. At step 322, trailing path quality measure $Q_{TP}(t)$ is computed. In one embodiment, trailing path quality measure $Q_{TP}(t)$ is computed using a current CDWL value and a previous CDWL value (i.e., $Q_{TP}=1-(CDWL(t)/CDWL(t-1)))$. Upon completion of contemporaneous determination of the current quality of the leading path and the current quality of the trailing path, method 300 proceeds to step 324.

At step 324, a determination is made as to whether protection quality is degraded. In one embodiment, leading path quality is considered degraded in response to detection that leading path quality measure $Q_{LP}$ crosses leading path quality measure threshold $Q_{LP-TH}$. In one embodiment, the quality of the leading path is considered degraded if leading path quality measure $Q_{LP}$ is less than leading path quality measure threshold $Q_{LP-TH}$. In one embodiment, leading path quality measure threshold $Q_{LP-TH}$ is computed according to CSWL, protection quality tolerance T, and at least one configuration factor (e.g., $Q_{LP-TH}=1-(f_2)(CSWL/T))$. In one embodiment, trailing path quality is considered degraded in response to detection that trailing path quality measure $Q_{TP}$ crosses trailing path quality measure threshold $Q_{TP-TH}$. For example, in one embodiment, trailing path quality is considered degraded if trailing path quality measure $Q_{TP}$ is less than a trailing path quality measure threshold $Q_{TP-TH}$. In one embodiment, trailing path quality measure threshold $Q_{TP-TH}$ is determined according to protection quality tolerance T and at least one configuration factor (e.g., $Q_{TP-th}=f_3(1-T))$.

If either the leading path quality is degraded (e.g., $Q_{LP}<Q_{LP-TH}$) or the trailing path quality is degraded (e.g., $Q_{TP}<Q_{TP-TH}$), overall packet protection quality is considered degraded and method 300 proceeds to step 326, at which point at least one countermeasure is initiated. In one embodiment, a countermeasure is operable for preventing further protection quality degradation. In one embodiment, a countermeasure is operable for improving packet protection quality. Upon initiation of countermeasures at step 326, method 300 proceeds to step 328, at which point a protection quality degradation notification is initiated to at least one remote system. Following initiation of the protection quality degraded notification, method 300 proceeds to step 330. If neither leading path quality nor trailing path quality is degraded (e.g., $Q_{LP} \geq Q_{LP-TH}$ and $Q_{TP} \geq Q_{TP-TH}$), the method 300 proceeds to step 330.

At step 330, a determination is made as to whether CDWL is less than CSWL (i.e., CDWL(t)<CSWL(t)). If CDWL is not less than CSWL, method 300 proceeds to step 334, at which point a determination is made as to whether a final packet is received. If CDWL is less than CSWL, method 300 proceeds to step 332. At step 332, CSWL is increased such that the condition CDWL<CSWL is restored (i.e., so that CDWL(t+1)<CSWL(t+1)). As such, in one embodiment, CSWL is set to a value greater than CDW (e.g., CSWL(t+1)= CDWL(t+1)+1). Following modification of CSWL, method 300 proceeds to step 334, at which point a determination is made as to whether a final packet is received.

At step 334, a determination is made as to whether the last received packet is the final packet associated with the current path pair. In one embodiment, the last received packet comprises the final packet associated with the path pair in response to a determination that the path pair is terminated. If the last received packet is not the final packet, method 300 returns to step 316, at which point a next packet is received. If the last received packet is the final packet, method 300 proceeds to step 336, where the method 300 ends.

FIG. 4 depicts a graphical representation of an example of improved packet protection according to the present invention. Specifically, FIG. 4 depicts a graphical representation of a relationship between a leading LSP and a trailing LSP in a packet 1+1 protection scheme. Furthermore, FIG. 4 depicts a graphical representation of the use of a CSWL and a CDWL for identifying packet losses indicative of packet protection degradation conditions. The improved packet protection representation 400 is described in the context of a MPLS network and, more specifically, with respect to a leading LSP and an associated trailing LSP.

As depicted in FIG. 4, improved packet protection representation 400 of FIG. 4 comprises a plurality of representations $402_A$-$402_F$ (collectively, representations 402), where each representation 402 comprises a graphical representation of an example of improved packet protection at a specific evaluation time (where evaluation time is incremented according to a number of received packets, e.g., evaluation time $t_4$ comprises a time at which the fourth packet is received). As such, as depicted in FIG. 4, each representation 402 comprises a leading LSP representation 410, a trailing LSP representation 420, a CSWL representation 430, and CDWL representation 440.

As depicted in FIG. 4, representation $402_A$ depicts an initial situation at time to (i.e., no packets received). For a given LSP pair, an associated application may request a protection quality measure Q. The protection quality measure Q is translated into a protection quality tolerance T, where protection quality tolerance T comprises a number of consecutive packets that the application can afford to lose without major impact. In one embodiment, as described herein, Q=f(1/T). For example, set protection quality tolerance T equal to three (T=3). Similarly, for a given LSP pair, the associated application may request a first configuration factor (i.e., $f_1$). For example, set first configuration factor $f_1$ equal to sixty-six percent (i.e., $f_1$=66%).

According to one embodiment of the present invention, degradation of the LSP pair begins if the protection quality tolerance threshold $T_{TH}$ is exceeded. As described herein, $T_{TH}=f_1(T)$. As such, in continuation of the present example, since $T_{TH}=(3)(66\%)=2$, if two consecutive packets are lost, detection of loss of the two packets provides an indication that protection quality is degraded and that a countermeasure must be initiated. Furthermore, according to one embodiment of the present invention, CSWL is initialized to CSWL ($t_0$)=T+1=4. By monitoring the difference between the leading LSP and the trailing LSP, CDWL is initialized to CDWL ($t_0$)=1. It should be noted that the initialized CDWL value is confirmed as CDWL($t_1$) through CDWL($t_4$).

As depicted in FIG. 4, representation 402$_B$ depicts a situation at time $t_4$, where no packets have been lost. The quality of the leading LSP is still equal to the initialized value $Q_{LP}$ ($t_4$)=1. In continuation of the present example, setting second configuration factor ($f_2$) equal to 50% results in a leading path quality measure threshold $Q_{LP-TH}$ of ⅓ (i.e., $Q_{LP-TH}$=⅓). Similarly, the quality of the trailing LSP is still equal to the initial value $Q_{TP}(t_4)$=0. In continuation of the present example, setting third configuration factor ($f_3$) equal to fifty percent results in a trailing path quality measure threshold $Q_{TP-TH}$ of −1 (i.e., $Q_{TP-TH}$=−1).

As depicted in FIG. 4, representation 402$_C$ depicts a situation at time $t_{20}$, where two packets are lost on the leading LSP. At this point, degradation of the LSP pair is identified since the number of lost packets is equal to the protection quality tolerance threshold $T_{TH}$. In one embodiment, a protection quality degraded notification is initiated to at least one remote system. In one embodiment, as described herein, the protection quality measure Q may be lowered in response to the decrease in protection quality, thereby resulting in a higher protection quality tolerance T. Furthermore, leading path quality measure $Q_{LP}$ decreases from the initial value $Q_{LP}(t_0)$=1 to $Q_{LP}(t_{20})$=1−(⅔)=⅓. As such, since the leading path quality measure threshold $Q_{LP-TH}$ is reached, a trigger may be issued for initiation of countermeasures.

In one embodiment, first configuration factor $f_1$, fourth configuration factor $f_4$, and fifth configuration factor $f_5$ may be set in a manner such that the leading path quality measure threshold $Q_{LP-TH}$ and the trailing path quality measure threshold $Q_{TP-TH}$ are exceeded before protection quality tolerance threshold $T_{TH}$ is exceeded. As such, internal countermeasures may be triggered before triggering of external protection quality degraded notifications towards at least one remote system. It should be noted that the packets lost on the leading LSP at times $t_{18}$ and $t_{19}$ could have possibly been recovered on the trailing LSP.

As depicted in FIG. 4, representation 402$_D$ depicts a situation at time $t_{24}$ in which one packet is lost on the trailing LSP. Since the trailing path quality measure $Q_{TP}(t_{24})$=1−(²⁄₁)=−1, the trailing path quality measure threshold $Q_{TP-TH}$ (i.e., $Q_{TP-TH}$=−1) is not yet exceeded. As such, countermeasures are not yet initiated. If, however, at time $t_{24}$, two packets are lost on the trailing LSP, the CDWL is increased to CDWL ($t_{24}$)=3 (depicted in representation 402$_E$). In this situation, the quality of the trailing LSP further decreases such that $Q_{TP}$ ($t_{25}$)=1−((³⁄₁))=−2. Since the trailing path quality measure threshold $Q_{TP-TH}$ (i.e., $Q_{TP-TH}$=−1) is exceeded, a trigger operable for initiating preventive countermeasures is issued. In other words, this situation indicates a serious degradation of the trailing LSP.

As depicted in FIG. 4, representation 402$_F$ depicts a situation at time $t_{32}$ in which CSW is increased in response to a determination that CDWL>CSWL. In other words, if the trailing LSP continues to lose packets, CDWL must be increased to CDWL($t_{32}$)=4. Since this increase of CDW violates the condition requiring that CDWL(t)<CSWL(t), the CSWL must be increased in order to adapt to the changed conditions. As such, the CSWL is increased such that CSWL ($t_{32}$)=4+1=5. It should be noted that FIG. 4 merely depicts a graphical representation of an example of improved packet protection implemented according to one embodiment of the present invention.

Although primarily described herein with respect to packet 1+1 protection in a network utilizing MPLS, the methodologies of the present invention may be used for implementing improved packet protection in various other networks. Similarly, although primarily described herein with respect to packet 1+1 protection, the methodologies of the present invention may be used for implementing improved protection in various other packet protection schemes. Furthermore, it is contemplated that at least a portion of the described functions may be combined into fewer functional elements. Similarly, it is contemplated that various functions may be performed by other functional elements, or that the various functions may be distributed across the various functional elements in a different manner.

Figure 5:
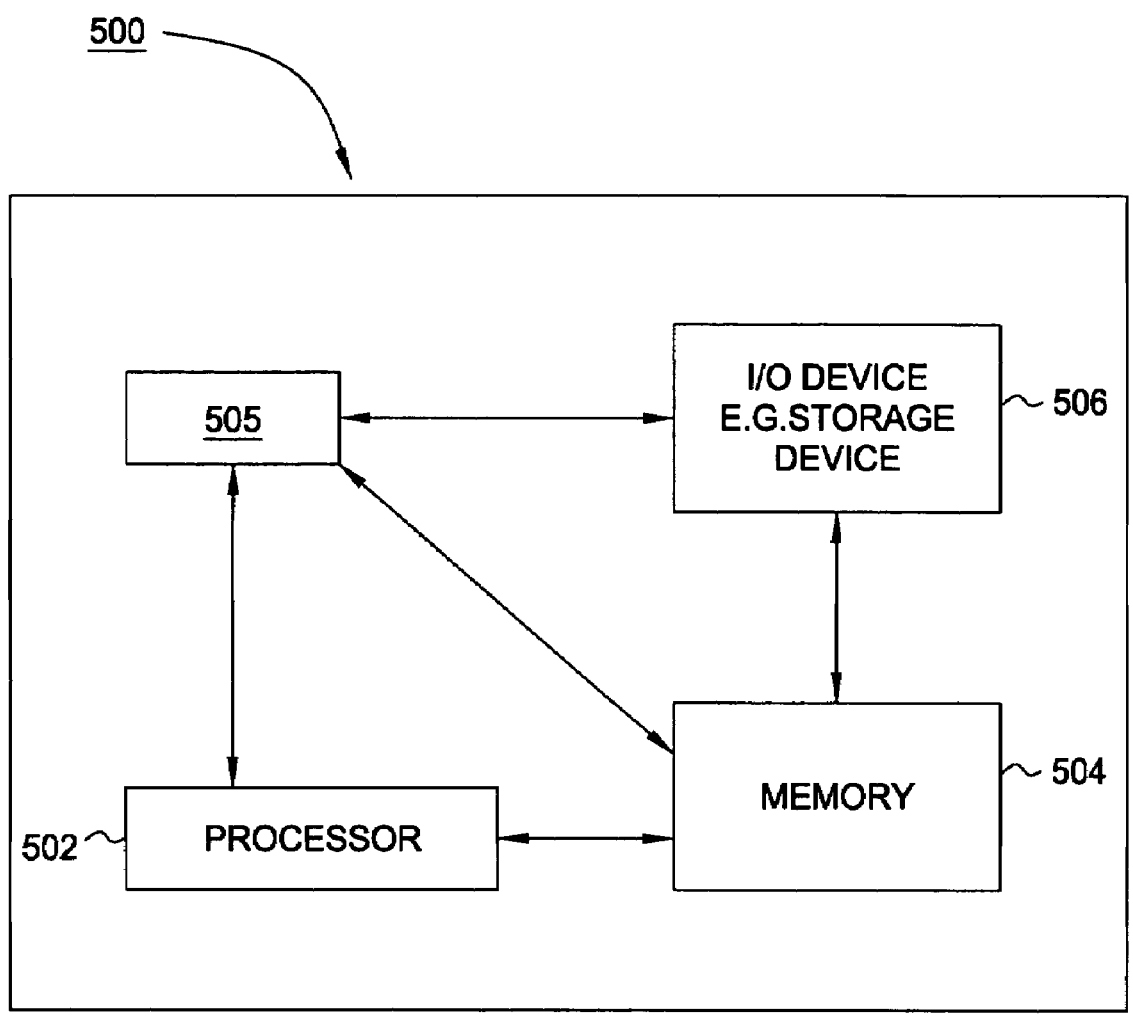
FIG. 5 depicts a high-level block diagram of a general purpose computer suitable for use in performing the functions described herein.

FIG. 5 depicts a high-level block diagram of a general purpose computer suitable for use in performing the functions described herein. As depicted in FIG. 5, system 500 comprises a processor element 502 (e.g., a CPU), a memory 504, e.g., random access memory (RAM) and/or read only memory (ROM), a packet protection quality module 505, and various input/output devices 506 (e.g., storage devices, including but not limited to, a floppy drive, a hard disk drive or a compact disk drive, a receiver, a transmitter, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present packet protection quality module or process 505 can be loaded into memory 504 and executed by processor 502 to implement the functions as discussed above. As such, packet protection quality process 505 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:
1. A method for monitoring packet protection quality, comprising:
  initializing a current sliding window comprising a current sliding window length, wherein said current sliding window is an adaptive window;

measuring a current delay window length of a current delay window by monitoring a difference between a leading path counter and a trailing path counter; and identifying a quality degradation condition in response to a determination that said current delay window length exceeds said current sliding window length.

2. The method of claim 1, further comprising:

modifying said current sliding window length in response to said determination that said current delay window length exceeds said current sliding window length, said current sliding window length modified such that said current delay window length is less than said current sliding window length.

3. The method of claim 1, further comprising:

measuring a leading path quality associated with said leading path;

measuring a trailing path quality associated with said trailing path; and identifying a path quality degradation condition in response to at least one of:
  determining that said leading path quality measure crosses a leading path quality threshold; and
  determining that said trailing path quality measure crosses a trailing path quality threshold.

4. The method of claim 3, wherein said measuring a leading path quality comprises:

determining a number of lost packets;

determining a protection quality tolerance; and computing said leading path quality measure using said number of lost packets and said protection quality tolerance.

5. The method of claim 3, wherein said leading path quality threshold is determined using said current sliding window length and a protection quality tolerance, wherein said protection quality tolerance is inversely proportional to a packet protection quality measure.

6. The method of claim 3, wherein said measuring a trailing path quality comprises:

determining a current value of said current delay window length;

determining a previous value of said current delay window length; and computing said trailing path quality measure using a ratio between said current value of said current delay window length and said previous value of said current delay window length.

7. The method of claim 3, wherein said leading path quality threshold is determined using a protection quality tolerance, wherein said protection quality tolerance is inversely proportional to a packet protection quality measure.

8. The method of claim 3, further comprising:

initiating at least one countermeasure in response to at least one of said quality degradation condition and said path quality degradation condition, said at least one countermeasure operable for improving a packet protection quality measure.

9. The method of claim 3, further comprising:

initiating at least one notification in response to at least one of said quality degradation condition and said path quality degradation condition.

10. The method of claim 3, wherein said leading path quality threshold and said trailing path quality threshold are configured in a manner such that said path quality degradation condition is detected before said quality degradation condition.

11. A method for monitoring packet protection quality, comprising:

establishing a packet protection quality measure;

converting said protection quality measure into a protection quality tolerance, said protection quality tolerance comprising a number of consecutive packets for which loss is acceptable;

computing a leading path quality threshold associated with a leading path, said leading path quality threshold computed using said protection quality tolerance and a current sliding window length;

computing a trailing path quality threshold associated with a trailing path, said trailing path quality threshold computed using said protection quality tolerance; and identifying a path quality degradation condition in response to at least one of:
  determining that a leading path quality measure associated with the leading path crosses the leading path quality threshold; and
  determining that a trailing path quality measure associated with the trailing path crosses the trailing path quality threshold.

12. The method of claim 11, further comprising:

initializing a current sliding window comprising said current sliding window length, wherein said current sliding window is an adaptive window;

measuring a current delay window length of a current delay window by monitoring a difference between a leading path counter and a trailing path counter; and identifying a quality degradation condition in response to a determination that said current delay window length exceeds said current sliding window length.

13. The method of claim 12, further comprising:

modifying said current sliding window length in response to said determination that said current delay window length exceeds said current sliding window length, said current sliding window length modified such that said current delay window length is less than said current sliding window length.

14. The method of claim 12, further comprising:

initiating at least one countermeasure in response to at least one of said path quality degradation condition and said quality degradation condition, said at least one countermeasure operable for improving said packet protection quality.

15. The method of claim 12, further comprising:

initiating at least one notification in response to at least one of said path quality degradation condition and said quality degradation condition.

16. The method of claim 12, wherein said protection quality threshold, said leading path quality threshold, and said trailing path quality threshold are configured in a manner such that said path quality degradation condition is detected before said quality degradation condition.

17. The method of claim 11, further comprising:

determining the leading path quality measure associated with said leading path; and determining the trailing path quality measure associated with said trailing path.

18. A method, comprising:

measuring a leading path quality associated with a leading path;

measuring a trailing path quality associated with a trailing path by determining a current value of a current delay window length, determining a previous value of said current delay window length, and computing said trailing path quality using a ratio between said current value of said current delay window length and said previous value of said current delay window length; and identifying a path quality degradation condition in response to at least one of:

determining that said leading path quality measure crosses a leading path quality threshold: and determining that said trailing path quality measure crosses a trailing path quality threshold.

19. The method of claim 18, wherein said measuring a leading path quality comprises:

determining a number of lost packets;

determining a protection quality tolerance; and computing said leading path quality measure using said number of lost packets and said protection quality tolerance.

* * * * *